(12) United States Patent
Esemplare

(10) Patent No.: US 7,718,719 B2
(45) Date of Patent: May 18, 2010

(54) METHOD OF STABILIZING A NORMALLY SOLID POLYALKYLENE CARBONATE RESIN AGAINST THERMAL AND HYDROLYTIC DECOMPOSITION FOR AT LEAST PRODUCING TOUGH COATINGS WITH EXCELLENT ADHESION TO BOTH FERROUS AND NON-FERROUS METALS

(76) Inventor: Pascal Esemplare, 583 Woodland Ave., Mountainside, NJ (US) 07092

( * ) Notice: Subject to any disclaimer, the term of this patent is extended or adjusted under 35 U.S.C. 154(b) by 579 days.

(21) Appl. No.: 11/639,600

(22) Filed: Dec. 15, 2006

(65) Prior Publication Data

US 2007/0093574 A1 Apr. 26, 2007

Related U.S. Application Data

(63) Continuation-in-part of application No. 10/736,032, filed on Dec. 13, 2003, now abandoned.

(51) Int. Cl.
*C08K 5/34* (2006.01)
*C08K 3/10* (2006.01)
(52) U.S. Cl. ............ 524/93; 524/104; 524/437
(58) Field of Classification Search .......... 524/93, 524/104, 437
See application file for complete search history.

(56) References Cited

U.S. PATENT DOCUMENTS

| | | | | | |
|---|---|---|---|---|---|
| 3,248,414 | A | * | 4/1966 | Stevens | 558/266 |
| 3,248,415 | A | * | 4/1966 | Stevens | 558/266 |
| 3,248,416 | A | * | 4/1966 | Stevens | 558/266 |
| 4,145,525 | A | * | 3/1979 | Dixon et al. | 525/410 |
| 4,528,364 | A | * | 7/1985 | Prier | 528/370 |

* cited by examiner

*Primary Examiner*—Kriellion A Sanders
(74) *Attorney, Agent, or Firm*—Charles E. Baxley

(57) ABSTRACT

A method of stabilizing a normally solid polyalkylene carbonate resin against thermal and hydrolytic decomposition, including the step of adding a cyclic amine selected from the group consisting of imidazole and 2-ethyl 4-methylimidazole at a wt. % of 5 to 45% of the normally solid polycarbonate resin. And, a method of producing tough coatings with excellent adhesion to both ferrous and non-ferrous metals, including the steps of: a) dissolving polyalkylene carbonate resin and a cyclic amine selected from the group of consisting of imidazole and 2-ethyl 4-methylimidazole at a wt. % of 5 to 45% of the normally solid polycarbonate resin in a solvent selected from the group consisting of methyl ethyl ketone and propylene glycol mono methyl ether acetate by mechanical mixing so as to form a solution; b) coating the ferrous or non-ferrous metals with the solution so as to form a coated metal; c) air drying the coated metal to evaporate the solvent so as to form an air-dried coated metal; and, d) curing the air-dried coated metal for a time selected from the group consisting of at least 12 hours at ambient temperature and 15 minutes at 150° C.

9 Claims, No Drawings

METHOD OF STABILIZING A NORMALLY SOLID POLYALKYLENE CARBONATE RESIN AGAINST THERMAL AND HYDROLYTIC DECOMPOSITION FOR AT LEAST PRODUCING TOUGH COATINGS WITH EXCELLENT ADHESION TO BOTH FERROUS AND NON-FERROUS METALS

1. CROSS REFERENCE TO RELATED APPLICATION

The instant application is a Continuation-In-Part application of application Ser. No. 10/736,032, filed on Dec. 13, 2003 now abandoned and entitled STABILIZING POLYALKYLENE CARBONATE RESINS.

2. BACKGROUND OF THE INVENTION

A. Field of the Invention

The embodiments of the present invention relate to a normally solid polyalkylene carbonate resin, and more particularly, the embodiments of the present invention relate to a method of stabilizing a normally solid polyalkylene carbonate resin against thermal and hydrolytic decomposition for at least producing tough coatings with excellent adhesion to both ferrous and non-ferrous metals.

B. Description of the Prior Art

Poly(alkylene carbonates) are copolymers of carbon dioxide and 1,2-epoxides. They are easily prepared by reacting an aliphatic or epoxide, e.g., ethylene oxide, propylene oxide, isobutylene oxide, in a solvent under pressure of 100 to 700 psig of carbon dioxide using an organometallic catalyst, typically zinc carboxylate, for up to 40 hours at 25° C. to 110° C.

These polymers can also be prepared by reacting a diol having at least 4 carbons separating the hydroxyl groups with a diester of carbonic acid in the presence of a catalyst selected from tertiary amines, alklyammonium salts, pyridinium salts, and basic ion-exchange resins containing active alkylammonium or tertiary amino groups. The end groups are either hydroxyls or carbonate esters.

According to Stevens (in U.S. Pat. Nos. 3,248,414; 3,248,415 and 3,248,416, poly(alkylene carbonate) polyols are prepared by reacting (a) carbon dioxide and 1,2-epoxides; (b) cyclic carbonates, such as ethylene carbonate; or (c) cyclic carbonates and 1,2-epoxide. A minor amount of a polyol is used as an initiator.

U.S. Pat. No. 3,248,415 to Stevens discloses that certain polyamines can be used as initiators in reactions with alkylene carbonates or alkylene oxides and carbon dioxide. These polyamines include: other organic compounds having at 2 active hydrogens, usually from 2-4 active hydrogens are used. By active hydrogen is meant a hydrogen linked directly to a nitrogen, sulfur, or oxygen atom, such as is found in hydroxyl, non-tertiary amino, mercapto, carbamate, and carboxyl groups. Each active hydrogen is linked to a different nitrogen, sulfur, or oxygen atom in the compound.

Polyamines, especially diamines in which the amino groups are primary or secondary, are suitable organics containing 2 active hydrogens. Piperazine and like polyamines wherein each of the nitrogens has one hydrogen linked thereto (secondary amino nitrogens) are preferred, according to Stevens.

Residual catalyst fragments in poly(alkylene carbonates) have a detrimental effect on the stability of these polymers by catalyzing depolymerization reactions ("unzipping"). The higher the temperature, the higher the rate of depolymerization. Even the terminal hydroxyl groups adversely affect the stability of these copolymers and stability is improved by reacting the free hydroxyl groups with a hydroxyl reactive phosphorus compound as disclosed by Dixon et al. in U.S. Pat. No. 4,145,525.

Prior in U.S. Pat. No. 4,528,364 it is stated that the presence of alkaline catalysts remaining in polyalkylene carbonate polyols adversely affect the performance and that these fragments must be removed. In addition, water (moisture) has a detrimental effect, hydrolyzing the polyalkylene carbonate.

Poly(propylene carbonate), for example, decomposes to polylene carbonate by an unzipping mechanism and scission of the carbonate linkage via hydrolysis. Unzipping starts at the end of the chain and continues to proceed by producing more cyclic monomer (propylene carbonate) as the length of the chain decreases. This is an equilibrium reaction where depolymerization and subsequent polymerization occur.

The propylene carbonate produced acts as a plasticiser for the polymer and thus the product as received by the customer becomes clumped together. Pellets of Qpac (Empower Materials, Inc., Newark, Del.) polyalkylene carbonate become stuck together and very difficult to separate; similarly, powered product becomes one solid mass. This is why the additional processing described above (removal of catalyst residues and reacting the terminal hydroxyl groups) is required.

3. SUMMARY OF THE INVENTION

Thus, it is an object of the embodiments of the present invention to provide a method of stabilizing a normally solid polyalkylene carbonate resin against thermal and hydrolytic decomposition for at least producing tough coatings with excellent adhesion to both ferrous and non-ferrous metals.

Briefly stated, another object of the embodiments of the present invention is to provide a method of stabilizing a normally solid polyalkylene carbonate resin against thermal and hydrolytic decomposition, including the step of adding a cyclic amine selected from the group consisting of imidazole and 2-ethyl 4-methylimidazole at a wt. % of 5 to 45% of the normally solid polycarbonate resin.

Briefly stated, still another object of the embodiments of the present invention is to provide a method of producing tough coatings with excellent adhesion to both ferrous and non-ferrous metals, including the steps of: a) dissolving polyalkylene carbonate resin and a cyclic amine selected from the group of consisting of imidazole and 2-ethyl 4-methylimidazole at a wt. % of 5 to 45% of the normally solid polycarbonate resin in a solvent selected from the group consisting of methyl ethyl ketone and propylene glycol mono methyl ether acetate by mechanical mixing so as to form a solution; b) coating the ferrous or non-ferrous metals with the solution so as to form a coated metal; c) air drying the coated metal to evaporate the solvent so as to form an air-dried coated metal; and, d) curing the air-dried coated metal for a time selected from the group consisting of at least 12 hours at ambient temperature and 15 minutes at 150° C.

The novel features which are considered characteristic of the embodiments of the present invention are set forth in the appended claims. The embodiments of the present invention themselves, however, both as to their construction and their method of operation together with additional objects and advantages thereof will be best understood from the following description of the specific embodiments.

4. DETAILED DESCRIPTION OF THE PREFERRED EMBODIMENTS

A. General

Prior art states that polyalkylene carbonates must be purified to be viable in commercial applications. Referenced patents describe purification techniques employed. The embodiments of the present invention include a simple chemical system achieving stability through a cross-linking mechanism eliminating the need for any of the above-mentioned purification techniques making polyalkylene carbonates both hydrolytically and thermally stable. In addition, the adhesion of polyalkylene carbonates to various substrates is improved and the toughness of the film is increased. Of critical importance is the fact that this addition does not impair the clean burning characteristics of the polyalkylene carbonates.

The chemical added is imidazole or 2-ethyl 4-methylimidazole. These are cyclic amines. Their addition to polyalkylene carbonates results in cross-linking of these thermoplastic materials and this cross-linking improves their stability and physical properties. This addition inhibits the depolymerization reaction described above. It produces a stable product without the need to remove catalyst fragments or react terminal hydroxy group with phosphorus compounds. Further, moisture no longer is a problem. Purification of the polyalkylene carbonates is no longer required.

Although it is not necessary to use purified poly(alkylene carbonates) in the embodiments of the present invention, it is important to understand the depolymerization reactions because they contribute to the cross-linking or formation of a three-dimensional network, which is an essential aspect of the embodiments of the present invention.

In other words, the embodiments of the present invention takes an inherent defect in the polymer produced and use it as part of the cross-linking mechanism yielding a staple polymer and therefore a viable product in the coatings industry as compared to an unstable coating that inherently decomposes and this decomposition is accelerated by heat and moisture rendering the coating a sticky mess.

The polyalkylene carbonate resin and the imidazole are dissolved in a suitable solvent at ambient temperature with stirring to obtain a homogeneous mix. Solvation can be accelerated with heat. The experiments below use Methyl ethyl ketone (MEK) and propylene glycol mono methyl ether acetate (PMA), but there are many suitable solvents.

The embodiments of the present invention produces a stable, flexible tough film after the solvent is removed. Solvent removal can be accelerated with heat with no detrimental effects. Cross-linking can be accomplished with a minimum of 12 hours at ambient temperature after the solvent has been evaporated. Temperatures ranging from 2 minutes @70° C. to 15 minutes @150° C. have successfully been used for cross-linking at elevated temperatures. Stable non-tacky coatings are produced even using polyalkylene carbonate emulsions.

The active hydrogen on the cyclic amines (imidazole) is directly responsible for the cross-linking of these materials. It is known that polyalkylene carbonate polyols are produced by reacting an alkylene carbonate, or alkylene oxide and carbon dioxide, with an organic compound having at least one hydrogen atom in the presence of an alkaline catalyst. Examples of these polyalkylene carbonate polyols and methods for their preparation are contained in Maximovich, U.S. Pat. No. 3,896,090; Maximovitch, U.S. Pat. No. 3,689,462; Springman, U.S. Pat. No. 3,313,782; and in Stevens in the patents cited above.

A functional group containing a reactive hydrogen means any moiety containing a hydrogen atom that will readily liberate the hydrogen atom and react with monomeric or polymeric alkylene carbonates. More specifically, reactive hydrogens means herein a hydrogen linked directly to a nitrogen, oxygen, or sulfur atom, such as is found in a non-tertiary amine, amide, hydroxy, mercapto, or carboxyl group.

The organic compound containing active hydrogen atoms of the embodiments of the present invention contain one or more of the following functional groups: hydroxyls, amines, mercaptans, carboxyls, sulfones, amides, imides, or carbonates.

Among desirable active hydrogen-containing organic compounds are polyamines; polyolsaliphatic polyols, cycloaliphatic polyols, and polyols containing oxy or other groups; polymercaptans; polyamides; polycarboxylic acids; alkylolamines and organic compounds containing three or more of the above-described functional groups containing reactive hydrogens.

The preferred classes are cyclic amines. Examples of cyclic amines are imidazoles, triazines, pyrimidines, imidazolines and their derivatives still possessing at least one amino hydrogen. These include: imidazolidin-4-one and its derivatives; triazine-2,4-dione and its derivatives; cyanuric acid, and 5,5-dimethyl hydantoin.

B. The Cross-Linking Mechanism

The first step is the attack on the linear chain by the secondary amine $R_2NH$ to produce a tertiary amine in the cleavage reaction. The second step in the process is the reaction of the tertiary amine with the carbonate to form a quaternary ammonium salt, which combines with anionic groups on adjacent chains in the system, as shown schematically:

(1) First Step.

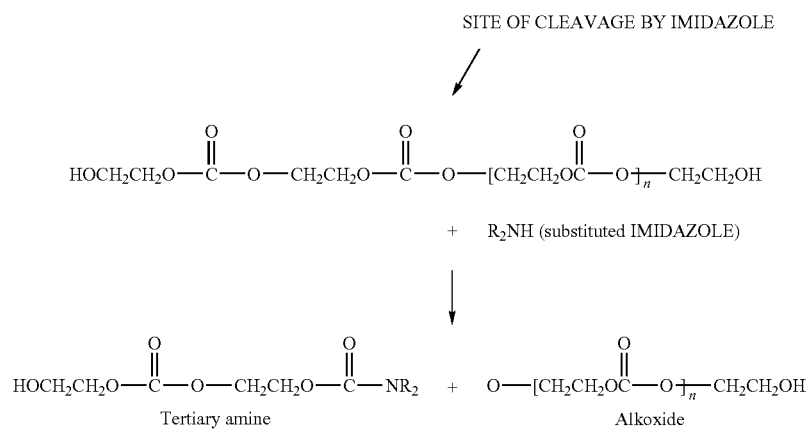

(2) Second Step—Reaction of Tertiary Amine with Carbonate on Polymer Chain to Form a Quaternary Ammonium Salt.

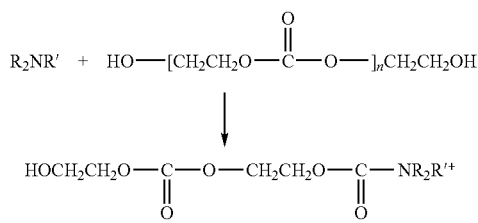

This combines with anionic groups on adjacent chains in the system:

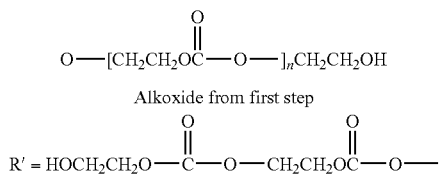

The alkoxide cleaves the O—CH$_2$ bond in the cyclic carbonate (propylene carbonate) to generate carbonate anions:

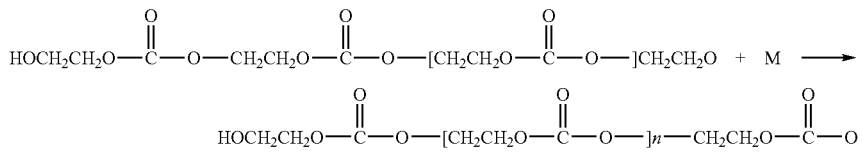

The carbonate anions are capable of initiating polymerization of the cyclic carbonate and can combine with the quaternary ammonium groups on a neighboring chain in an exchange reaction.

M=propylene carbonate monomer

In the depolymerization or unzipping reaction, as the cyclic monomer is formed, it leaves a chain with hydroxyl end groups. These free hydroxyls also initiate polymerization of the cyclic carbonate via an anionic mechanism and this polymerization is subsequently terminated with quaternary ammonium ions of a branched chain. Moreover, this polymerization is catalyzed by tertiary and quaternary amine groups. This results in the formation of the three-dimensional network. In essence, the carbonate and alkoxide ions combine with the quaternary ammonium nitrogens to produce the cross-linked gel.

Known in the industry as $CO_2$ polymers, Poly(alkylene carbonates) are thermoplastic materials and their first commercial application was the development of poly(propylene carbonate) as a binder in metals/ceramics formations for the electronics industry. The relevant properties are low decomposition temperatures, very low ash residues, and clean products of combustion. One of the important aspects of the embodiments of the present invention is that the cross-linked polyalkylene carbonates still depolymerize at low temperatures and burn clean with very low ash residues comparable to the thermoplastic base polyalkylene carbonate.

C. Examples

The following examples are included for illustrative purposes only, and do not limit the scope of the embodiments of the present invention. Unless otherwise stated, all parts and percentages are by weight.

(1) Example I

A Sprayable Formulation for an Aluminum Sheet for the Aluminum Brazing Industry

The formulation is as follows:

| INGREDIENT | PERCENTAGE |
| --- | --- |
| Polypropylene carbonate | 5.72 |
| Propylene glycol methyl ether acetate | 34.59 |
| Methyl Ethyl Ketone | 49.0 |

-continued

| INGREDIENT | PERCENTAGE |
| --- | --- |
| 2-ethyl 4-methylimidazole* | 0.69 |
| KAlF$_4$ | 10.0 |
| Total | 100.0 |

*This is one of a series of substituted imidazoles commercially available from air Products, Allentown, PA, under the "Curezol" and "Imcure" Tradenames.

The first four ingredients are stirred at ambient temperatures until totally dissolved and then the flux (KAlF$_4$) is dispersed in this mixture. The mixture is sprayed onto the aluminum substrate and the solvents removed by air drying and/or heating. The coating then is quick cured, e.g., 2 minutes @70° C. The coating is now tough and stable with good adhesion to the base metal. It can now be stacked, formed into a coil, or otherwise packaged and transported without any possibility of flaking or dusting. It delivers the proper amount of flux for brazing, eliminating waste and health hazards. The coated sheets were cut and shaped into different forms and heated by a torch to produce brazed joints that were very clean with minimal residue.

(2) Example II

A Dipping Formulation for Aluminum Rings Using Cesium Fluoride as the Flux and Imidazole as the Cross-Linking Agent The formulation is as follows:

| INGREDIENT | PERCENTAGE |
| --- | --- |
| Polypropylene Carbonate | 15.0 |
| Imidazole | 2.5 |
| Propylene glycol methyl ether acetate | 20.0 |
| Methyl Ethyl Ketone | 30.0 |
| Cesium Aluminum Fluoride | 32.5 |
| Total | 100.0 |

The first four ingredients are stirred at ambient temperature until totally dissolved and then the powered flux (cesium aluminum fluoride) is dispersed in the mixture. The rings are dipped into the mix, air dried, and then cured for 2 minutes @70° C. The rings now have a tough flux coating that can take rough handling.

(3) Example III

Coating Alcoa 718 Aluminum Silica Rods by a Dipping Technique Using $KAlF_4/CsAlF_4$ (95/5) as the Flux The formulation is as follows:

| INGREDIENT | PERCENTAGE |
| --- | --- |
| Polypropylene Carbonate | 9.78 |
| 2-ethyl 4-methylimidazole | 1.20 |
| Propylene glycol methyl ether acetate | 22.82 |
| Methyl Ethyl Ketone | 36.26 |
| $KAlF_4/CsAlF_4$ | 29.94 |
| Total | 100.00 |

Again the first four ingredients are stirred at ambient temperature until totally dissolved and the flux is dispersed in the mixture. The rods were dipped into the above mix and cured for 2 minutes @55° C. A tough flux coating with good adhesion resulted. Retains of these rods are exactly as made after 4 years storage at ambient temperature. There is no sign of depolymerization and they are non-tacky.

(4) Example IV

Examples Demonstrating Improved Adhesion and Toughness

In all these formulations, the polypropylene carbonate and the 2-ethyl 4-methylimidazole were dissolved in Methyl ethyl Ketone and then the flux was dispersed in the solutions. Samples 1-5 were sprayed onto steel Q panels, air dried for solvent removal and cured 15 minutes at 150° C. in a laboratory oven.

| SAMPLE NO. | % POLYPROPYLENE CARBONATE | % $KAlF_4$ FLUX | % 2-ETHYL 4-METHYL IMIDAZOLE | 2-ETHYL 4-METHYL IMIDAZOLE WT. % OF POLYCARBONATE RESIN |
| --- | --- | --- | --- | --- |
| 1 (Control) | 36.39 | 63.61 | — | — |
| 2 | 34.86 | 60.94 | 4.20 | 12.05 |
| 3 | 33.92 | 59.28 | 6.80 | 20.05 |
| 4 | 32.83 | 57.40 | 9.77 | 29.76 |
| 5 | 22.56 | 67.67 | 9.77 | 43.30 |

NOTE:
The percentages listed are weight percent in the dry coating after solvent evaporation.

In this example, the wt. % of 2-ethyl 4-methyl imidazole to polycarbonate resin is 12.06%. The wt. % of potassium aluminum fluoride flux in the dry coating is 60.94%.

In sample no. 5 the flux content was increased to see if the binder system could handle higher loadings. As going from sample nos. 1 through 5, the end product is progressively tougher and shows improved adhesion. Sample no. 1 on a Q panel and bent over a 1/8 inch mandrel flakes off. Sample no. 2 can be pried off. Sample no. 3 could not be removed. And, samples nos. 4 and 5 can be twisted, bent, and hammered and the coating does not come off.

It is believed that the adhesion is also helped by the fact that the imidazole lowers the contact angle and improves the flow properties of the polypropylene carbonate enabling it to wet the substrate better.

In this example the wt. % of imidazole to polycarbonate resin is 16.67%. The wt. % of cesium aluminum fluoride flux in the dry coating is 65%.

(5) Example V

Modification to Function in an Ultrasonic Spray System

This is a low-pressure system delivering precise spraying and essentially eliminates over spray. Work was done with the Sono-Tek Corporation of Melton, N.Y. The formulation was adjusted as follows to accommodate the Sono-Tek equipment:

| INGREDIENT | PERCENTAGE |
| --- | --- |
| Polypropylene Carbonate | 2.6 |
| Propylene glycol methyl ether acetate | 41.18 |
| Methyl Ethyl Ketone | 50.00 |
| 2-ethyl 4-methylimidazole | 0.34 |
| KAlF$_4$ | 5.88 |
| Total | 100.00 |

The first 4 ingredients are stirred at ambient temperature until totally dissolved and then the flux (potassium aluminum fluoride) was added with stirring. Aluminum strips approximately ¾ inch wide were coated and air dried for several minutes then dried and cured in an oven at 70° C. for 3-4 minutes. The coatings produced were tough exhibiting good adhesion.

In this example the wt. % of 2-ethyl 4-methylimidazole to polycarbonate resin is 12.27%. The wt. % of potassium aluminum fluoride/cesium aluminum fluoride flux mixture in the dry coating is 73.17%.

(6) Example VI

Using Polypropylene Carbonate Emulsion for a Water-Based System

The formulation is as follows:

| INGREDIENT | PERCENTAGE |
| --- | --- |
| Polypropylene Carbonate Emulsion (24.5% solids) | 23.20 |
| Water | 66.13 |
| 2-ethyl 4-methylimidazole | 0.69 |
| KAlF$_4$ | 10.00 |
| Total | 100.00 |

The first 3 ingredients were mixed at room temperature until the 2-ethyl 4-methylimidazole is totally dissolved. Then the flux (potassium aluminum fluoride) is added. Aluminum panels were sprayed with the mix and the coating dried in an oven for 10 minutes @80° C. The coatings produced were tough, stable, and comparable to the solvent-based systems.

In this example the wt. % of 2-ethyl 4-methylimidazole to polycarbonate resin is 12.1%. The wt. % of potassium aluminum fluoride flux in the dry coating is 61.09%.

D. Conclusions

Polyalkylene carbonate resins are stabilized against thermal and hydrolytic decomposition by the addition of a cyclic amine eliminating the need for complex chemical or other purifying techniques. Cyclic amines, such as imidazole and substituted imidazoles (specifically 2-ethyl 4-methyl imidazole) were found to be effective at 5-30%, preferably 10-30%. Pressures for producing stable fluxes containing coatings for the aluminum brazing industry are developed. The modified polyalkylene carbonate resins have been shown to have better adhesive properties than the unmodified resins while maintaining their low ash, clean burning characteristics.

It will be understood that each of the elements described above or two or more together may also find a useful application in other types of constructions differing from the types described above.

While the embodiments of the present invention have been illustrated and described as embodied in a method of stabilizing a normally solid polyalkylene carbonate resin against thermal and hydrolytic decomposition for at least producing tough coatings with excellent adhesion to both ferrous and non-ferrous metals, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis the foregoing will so fully reveal the gist of the embodiments of the present invention that others can by applying current knowledge readily adapt it for various applications without omitting features that from the standpoint of prior art fairly constitute characteristics of the generic or specific aspects of the embodiments of the present invention.

The invention claimed is:

1. A method of stabilizing a normally solid polyalkylene carbonate resin against thermal and hydrolytic decomposition, comprising the step of adding a cyclic amine selected from the group consisting of imidazole and 2-ethyl-4-methylimidazole at a wt. % of 5 to 45% of the normally solid polycarbonate resin.

2. The method of claim 1, wherein the cyclic amine is at a wt. % of 10 to 30% of the normally solid polyalkylene carbonate resin.

3. A method of producing tough coatings with excellent adhesion to both ferrous and non-ferrous metals, comprising the steps of:
    a) dissolving a polyalkylene carbonate resin and a cyclic amine selected from the group consisting of imidazole and 2-ethyl-4-methylimidazole at a wt. % of 5 to 45% of the polycarbonate resin in a solvent selected from the group consisting of methyl ethyl ketone and propylene glycol mono methyl ether acetate by mechanical mixing so as to form a coating solution;
    b) coating the ferrous or non-ferrous metals with the coating solution so as to form a coated metal;
    c) air drying the coated metal to evaporate the solvent so as to form an air-dried coated metal; and
    d) curing the air-dried coated metal for one of at least 12 hours at ambient temperature or 15 minutes at 150° C.

4. The method of claim 3, further comprising the step of dispersing a powered brazing flux of potassium aluminum fluoride into the coating solution to produce a brazing coating.

5. The method of claim 4, wherein said dispersing step includes dispersing a powered brazing flux of potassium aluminum fluoride in a range of 40 to 75% by weight of the dry coating after the solvent has evaporated.

6. The method of claim 3, further comprising the step of dispersing a powered brazing flux of cesium aluminum fluoride into the coating solution to produce a brazing coating.

7. The method of claim 6, wherein said dispersing step includes dispersing a powered brazing flux of cesium aluminum fluoride in a range of 40 to 75% by weight of the dry coating after the solvent has evaporated.

8. The method of claim 3, further comprising the step of dispersing a powered brazing flux of a mixture of both potassium aluminum fluoride and cesium aluminum fluoride into the coating solution to produce a brazing coating.

9. The method of claim 8, wherein said dispersing step includes dispersing a powered brazing flux of a mixture of both potassium aluminum fluoride and cesium aluminum fluoride in a range of 40 to 75% by weight of the dry coating after the solvent has evaporated.

* * * * *